No. 664,506. Patented Dec. 25, 1900.
L. M. RICHARDSON.
TIRE TIGHTENER.
(Application filed Oct. 16, 1900.)
(No Model.)
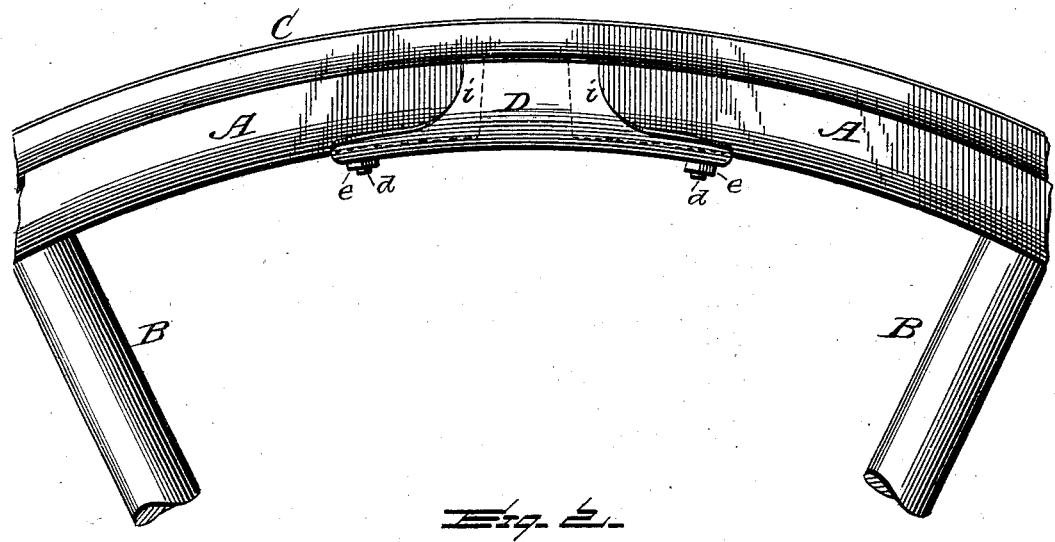
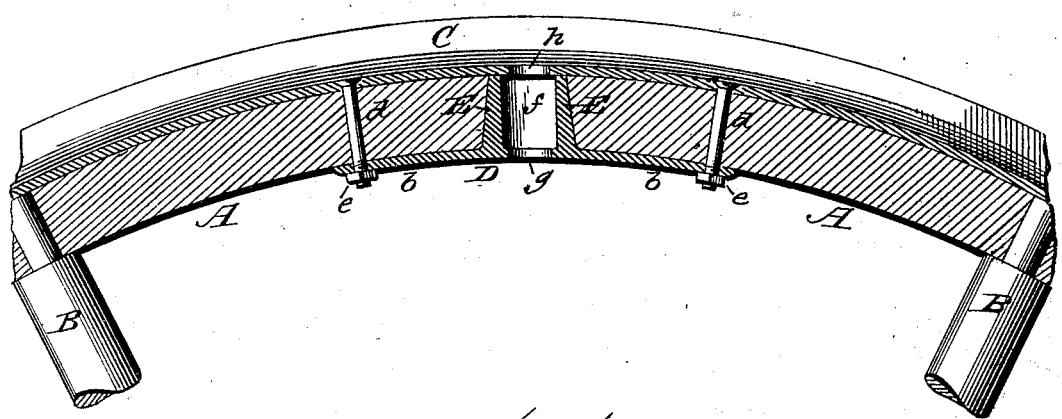
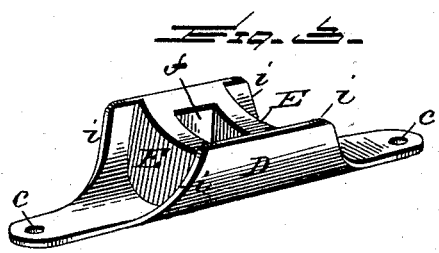
WITNESSES:
L. C. Hills
M. D. Musson
INVENTOR
Leon Murry Richardson.
BY Chas H. Fowler
Attorney

UNITED STATES PATENT OFFICE.

LEON MURRY RICHARDSON, OF AMESBURY, MASSACHUSETTS, ASSIGNOR OF TWO-THIRDS TO THE STANDARD ANTI-FRICTION EQUIPMENT COMPANY, OF NEW YORK, N. Y.

TIRE-TIGHTENER.

SPECIFICATION forming part of Letters Patent No. 664,506, dated December 25, 1900.

Application filed October 16, 1900. Serial No. 33,246. (No model.)

*To all whom it may concern:*

Be it known that I, LEON MURRY RICHARDSON, a citizen of the United States, residing at Amesbury, in the county of Essex and State of Massachusetts, have invented certain new and useful Improvements in Tire-Tighteners; and I do hereby declare that the following is a full, clear, and exact description of the same, reference being had to the annexed drawings, making a part of this specification, and to the letters of reference marked thereon.

The present invention has reference to that class of devices for tightening the tires of vehicle-wheels by expanding the fellies thereof to increase the circumference of the wheel after the tire has been placed thereon; and the invention consists in a device constructed substantially as shown in the drawings and hereinafter described and claimed.

Figure 1 of the drawings is a side elevation of a portion of a vehicle-wheel embodying my invention; Fig. 2, a sectional view thereof; Fig. 3, a detail perspective view of the device employed for expanding the felly.

In the accompanying drawings, A represents the fellies, which form the segment of the rim of a wooden vehicle-wheel to which the spokes B are connected in the usual manner, and to the periphery of this rim is secured the channel or other metal tire C. The joints of the fellies being left open, the wheel can be sprung into dish shape, which will lessen the circumference of the wheel and admit of the tire being easily sprung on and into place. After the metal tire is in position upon the rim of the wheel the rim is allowed to come back into place, as shown in Fig. 1 of the drawings. The expanding device, as shown in Fig. 3 of the drawings, is now forced into the space between the fellies and by its peculiar construction will force the fellies outward, and thereby enlarge the circumference of the rim of the wheel, which will make the metal tire as tight upon the rim as though it were shrunk on, thus materially facilitating the tightening of the metal tire.

The expanding device, as illustrated in detail in Fig. 3 of the drawings, consists of a concavo-convex or other suitable plate D, having perforated or other form of clips $b$, by which the device is secured to the rim of the wheel. In the present instance I have shown the clips $b$ with perforations $c$, by which the clips are secured to the rim of the wheel by screw-bolts $d$ and nuts $e$, said bolts extending through the tire, felly, and clip. The plate D is formed with a recess or mortise $f$, having the end walls E inclined upon their outer side to form wedge-shaped walls, so that when entering the space between the fellies the same will be forced outward to increase the circumference of the wheel for the purpose of tightening the tire. The plate D has an opening $g$ on line with the recess or mortise $f$ and the tire C a similar opening $h$ on line therewith, so that the usual inflating-nipple of the pneumatic tire may be inserted through the chamber or mortise $f$ and through the opening $g$ within convenient reach from the under side of the rim of the wheel without weakening it, the expanding device acting as a support and strengthening the rim of the wheel.

I have shown a channel-tire adapted to receive the usual pneumatic tire; but the expanding device may be used for increasing the circumference of the wheel without regard to any special form of metal tire, the recess or mortise $f$ materially lightening the casting.

It will be noticed that the end walls E are located some distance from the edges of the plate D, so as to present flanges $i$ to embrace the ends of the fellies.

Having now fully described my invention, what I claim as new, and desire to secure by Letters Patent, is—

1. A tire-tightener, consisting of a plate having suitable means for securing it to the rim of the wheel, a recess or mortise and an opening on line therewith to receive the nipple of the pneumatic tire, and wedge-shaped end walls to the recess or mortise, substantially as and for the purpose described.

2. A channel-tire to receive a pneumatic tire and having an opening therein to receive the nipple of the pneumatic tire, an expanding device for the rim of the wheel comprising a plate having suitable clips, a recess or mortise having its end walls inclined on its outer side, and an opening in the plate on line with the recess or mortise, substantially as and for the purpose specified.

In testimony that I claim the above I have hereunto subscribed my name in the presence of two witnesses.

LEON MURRY RICHARDSON.

Witnesses:
 DUDLEY J. MARSTON,
 CHAS. E. STONE.